United States Patent
Suehiro et al.

(10) Patent No.: US 12,411,488 B2
(45) Date of Patent: Sep. 9, 2025

(54) CONTROL DEVICE, CONTROL METHOD, AND NON-TRANSITORY COMPUTER-READABLE RECORDING MEDIUM

(71) Applicant: TOYOTA JIDOSHA KABUSHIKI KAISHA, Toyota (JP)

(72) Inventors: Yuki Suehiro, Ichikawa (JP); Toshinobu Watanabe, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 380 days.

(21) Appl. No.: 18/081,122

(22) Filed: Dec. 14, 2022

(65) Prior Publication Data
US 2023/0259124 A1 Aug. 17, 2023

(30) Foreign Application Priority Data
Feb. 14, 2022 (JP) .................................. 2022-020780

(51) Int. Cl.
 G05D 1/00 (2024.01)
(52) U.S. Cl.
 CPC ......... *G05D 1/0022* (2013.01); *G05D 1/0061* (2013.01)
(58) Field of Classification Search
 CPC .............. G05D 1/0022; G05D 1/0061; G05B 19/0423; G05B 2219/25257
 See application file for complete search history.

(56) References Cited

U.S. PATENT DOCUMENTS

2005/0119801 A1* 6/2005 Florentin ............. G05D 1/0282
 348/148
2017/0192423 A1* 7/2017 Rust .................... G05D 1/0212
 (Continued)

FOREIGN PATENT DOCUMENTS

JP 2004-295360 A 10/2004
JP 2016-071585 A 5/2016
 (Continued)

OTHER PUBLICATIONS

Yaakov Bar-Shalom, "Update with Out-of-Sequence Measurements in Tracking: Exact Solution", IEEE Transactions on Aerospace and Electronic Systems, Jul. 2002, pp. 769-778, vol. 38, No. 3.
 (Continued)

*Primary Examiner* — Anne Marie Antonucci
*Assistant Examiner* — Patrick Daniel Mohl
(74) *Attorney, Agent, or Firm* — Sughrue Mion, PLLC

(57) ABSTRACT

A control device controls a moving body being a target of a remote operation performed by a remote operator. During the remote operation of the moving body, the control device performs a communication with a remote operator terminal on the remote operator side to receive remote operation information including a first operation amount caused by the remote operator. The control device acquires a delay amount of a communication from the remote operator terminal to the moving body based on a result of reception of the remote operation information. The control device executes a delay compensation process that compensates for a delay of the first operation amount based on the delay amount to calculate a first correction operation amount. The control device controls the moving body based on the first correction operation amount.

8 Claims, 16 Drawing Sheets

(56) References Cited

U.S. PATENT DOCUMENTS

| | | |
|---|---|---|
| 2017/0293295 A1 | 10/2017 | Tani |
| 2019/0146485 A1 | 5/2019 | Yoneda et al. |
| 2019/0361436 A1* | 11/2019 | Ueda ........................ G08G 1/09 |
| 2021/0037495 A1* | 2/2021 | Pfadler ............. H04W 56/0065 |
| 2022/0135067 A1* | 5/2022 | Pfadler .................. G07C 5/008 701/23 |

FOREIGN PATENT DOCUMENTS

| | | |
|---|---|---|
| JP | 2019012514 A | 1/2019 |
| JP | 2021-061516 A | 4/2021 |

OTHER PUBLICATIONS

Keshu Zhang et al., "Optimal Update with Out-of-Sequence Measurements", IEEE Transactions on Signal Processing, Jun. 2005, pp. 1992-2004, vol. 53, No. 6.

\* cited by examiner

FIG. 14

| | <OPERATION AMOUNT X> | | | |
|---|---|---|---|---|
| | X1: REMOTE OPERATOR          $X3 = a \cdot X1 + (1-a)X2$ | | | |
| | X2: AUTONOMOUS DRIVING FUNCTION (NORMAL) | | | |
| | X4: AUTONOMOUS DRIVING FUNCTION (EMERGENCY) | | | |
| No. | COMMUNICATION | TERMINAL | VEHICLE | X |
| 1 | ○ | ○ | ○ | X1 |
| 2 | ○ | ○ | △ | X1 |
| 3 | ○ | ○ | × | X1 or X4 |
| 4 | ○ | △ | ○ | X3 |
| 5 | ○ | △ | △ | X3 |
| 6 | ○ | △ | × | X3 or X4 |
| 7 | ○ | × | ○ | X2 |
| 8 | ○ | × | △ | X2 |
| 9 | ○ | × | × | X4 |
| 10 | △ | ○ | ○ | X1 |
| 11 | △ | ○ | △ | X1 |
| 12 | △ | ○ | × | X1 or X4 |
| 13 | △ | △ | ○ | X3 |
| 14 | △ | △ | △ | X3 |
| 15 | △ | △ | × | X3 or X4 |
| 16 | △ | × | ○ | X2 |
| 17 | △ | × | △ | X2 |
| 18 | △ | × | × | X4 |
| 19 | × | ○ | ○ | X2 |
| 20 | × | ○ | △ | X2 |
| 21 | × | ○ | × | X4 |
| 22 | × | △ | ○ | X2 |
| 23 | × | △ | △ | X2 |
| 24 | × | △ | × | X4 |
| 25 | × | × | ○ | X2 |
| 26 | × | × | △ | X2 |
| 27 | × | × | × | X4 |

CONTROL DEVICE, CONTROL METHOD, AND NON-TRANSITORY COMPUTER-READABLE RECORDING MEDIUM

CROSS-REFERENCE TO RELATED APPLICATION

This application claims priority to Japanese Patent Application No. 2022-020780 filed on Feb. 14, 2022, the entire contents of which are incorporated by reference herein.

BACKGROUND

Technical Field

The present disclosure relates to a technique for controlling a moving body that is a target of a remote operation performed by a remote operator.

Background Art

Patent Literature 1 discloses a driving control system for remotely controlling a vehicle. A remote operation device and a driving control device on the vehicle side perform wireless communication. The driving control device calculates a delay time of the wireless communication with the remote operation device. When the delay time is equal to or longer than a threshold, the driving control device changes driving control of the vehicle from normal control to safety control. For example, the safety control decreases the vehicle speed as compared with the case of the normal control.

In addition, techniques related to a remote operation of a vehicle are disclosed in Patent Literature 2 and Patent Literature 3.

In a field of metrology, a Kalman filter is generally known. The Kalman filter estimates a state of a system from measurement data. However, there is a gap between a data measurement timing and an operation timing of the Kalman filter, and the estimation accuracy decreases as the gap increases.

Non-Patent Literature 1 and Non-Patent Literature 2 disclose a "delayed Kalman filter" that can be applied to measurement data including a delay. The delayed Kalman filter is also called OOSM (Out-of-Sequence Measurement).

LIST OF RELATED ART

Patent Literature 1: Japanese Laid-Open Patent Application No. JP-2016-071585
Patent Literature 2: Japanese Laid-Open Patent Application No. JP-2004-295360
Patent Literature 3: Japanese Laid-Open Patent Application No. JP-2021-061516
Non-Patent Literature 1: Yaakov Bar-Shalom, "Update with Out-of-Sequence Measurements in Tracking: Exact Solution," IEEE Transactions on Aerospace and Electronic Systems, VOL. 38, No. 3, pp. 769-778, July 2002.
Non-Patent Literature 2: Keshu Zhang et "Optimal Update with Out-of-Sequence Measurements," IEEE Transactions on Signal Process, Vol. 53, No. 6, pp. 1992-2004, June 2005.

SUMMARY

A remote operation of a moving body (e.g., a vehicle, a robot) performed by a remote operator is considered. A remote operation system includes a moving body being a target of the remote operation and a remote operator terminal on the remote operator side. During the remote operation, the moving body and the remote operator terminal communicate with each other. The moving body acquires information of an operation amount caused by the remote operator from the remote operator terminal and performs control in accordance with the operation amount.

There is a delay in a communication from the remote operator terminal to the moving body. Therefore, it takes time for the operation amount input by the remote operator to be actually reflected in moving body control. As a result, the remote operation of the moving body by the remote operator may be awkward. In some case, the moving body may meander. This is not preferable from a view point of safety of the remote operation of the moving body.

An object of the present disclosure is to provide a technique that enables a remote operator to perform a remote operation of a moving body more smoothly and more safely.

A first aspect is directed to a control device that controls a moving body being a target of a remote operation performed by a remote operator.

The control device includes one or more processors.

The one or more processors are configured to:

during the remote operation of the moving body, perform a communication with a remote operator terminal on a side of the remote operator to receive remote operation information including a first operation amount caused by the remote operator;

acquire a delay amount of a communication from the remote operator terminal to the moving body based on a result of reception of the remote operation information;

execute a delay compensation process that compensates for a delay of the first operation amount based on the delay amount to calculate a first correction operation amount; and control the moving body based on the first correction operation amount.

A second aspect is directed to a control method for controlling a moving body being a target of a remote operation performed by a remote operator.

The control method includes:

during the remote operation of the moving body, performing a communication with a remote operator terminal on a side of the remote operator to receive remote operation information including a first operation amount caused by the remote operator;

acquiring a delay amount of a communication from the remote operator terminal to the moving body based on a result of reception of the remote operation information;

a delay compensation process that compensates for a delay of the first operation amount based on the delay amount to calculate a first correction operation amount; and controlling the moving body based on the first correction operation amount.

A third aspect is directed to a control program for controlling a moving body being a target of a remote operation performed by a remote operator.

The control program, when executed by a computer, causes the computer to:

during the remote operation of the moving body, perform a communication with a remote operator terminal on a side of the remote operator to receive remote operation information including a first operation amount caused by the remote operator;

acquire a delay amount of a communication from the remote operator terminal to the moving body based on a result of reception of the remote operation information;

execute a delay compensation process that compensates for a delay of the first operation amount based on the delay amount to calculate a first correction operation amount; and control the moving body based on the first correction operation amount.

According to the present disclosure, the delay compensation process that compensates for the delay of the first operation amount caused by the remote operator is executed in the moving body. The moving body is controlled based on the first correction operation amount acquired by the delay compensation process. As a result, the remote operator is able to perform the remote operation of the moving body more smoothly and more safely. Meandering of the moving body also is suppressed. That is, according to the present disclosure, safety of the remote operation of the moving body is improved.

BRIEF DESCRIPTION OF DRAWINGS

FIG. 14 is a diagram for explaining an example of an operation amount coordinating process according to an embodiment of the present disclosure;

EMBODIMENTS

Embodiments of the present disclosure will be described with reference to the accompanying drawings.

1. OVERVIEW OF REMOTE OPERATION SYSTEM

A remote operation (remote driving) of a moving body is considered. Examples of the moving body being a target of the remote operation include a vehicle, a robot, a flying object, and the like. The vehicle may be an autonomous driving vehicle or may be a vehicle driven by a driver. Examples of the robot include a logistics robot, a work robot, and the like. Examples of the flying object include an airplane, a drone, and the like.

As an example, in the following description, a case where the moving body being the target of the remote operation is a vehicle will be considered. When generalizing, "vehicle" in the following description shall be deemed to be replaced with "moving body."

Figure 1:
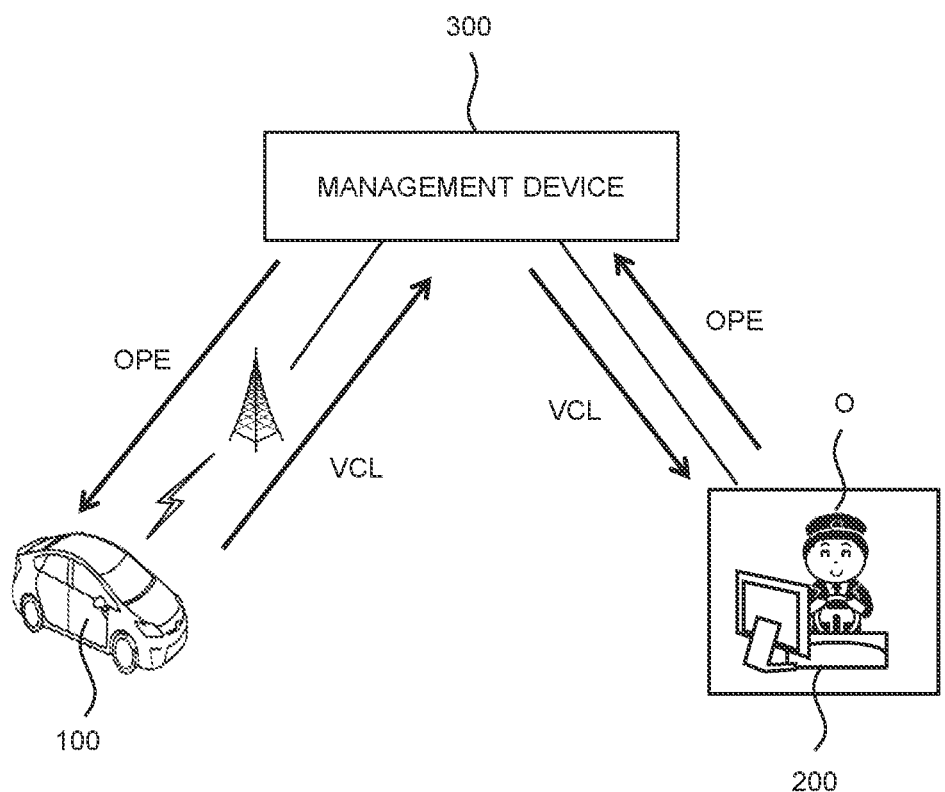
FIG. 1 is a schematic diagram showing a configuration example of a remote operation system according to an embodiment of the present disclosure.
Figure 2:
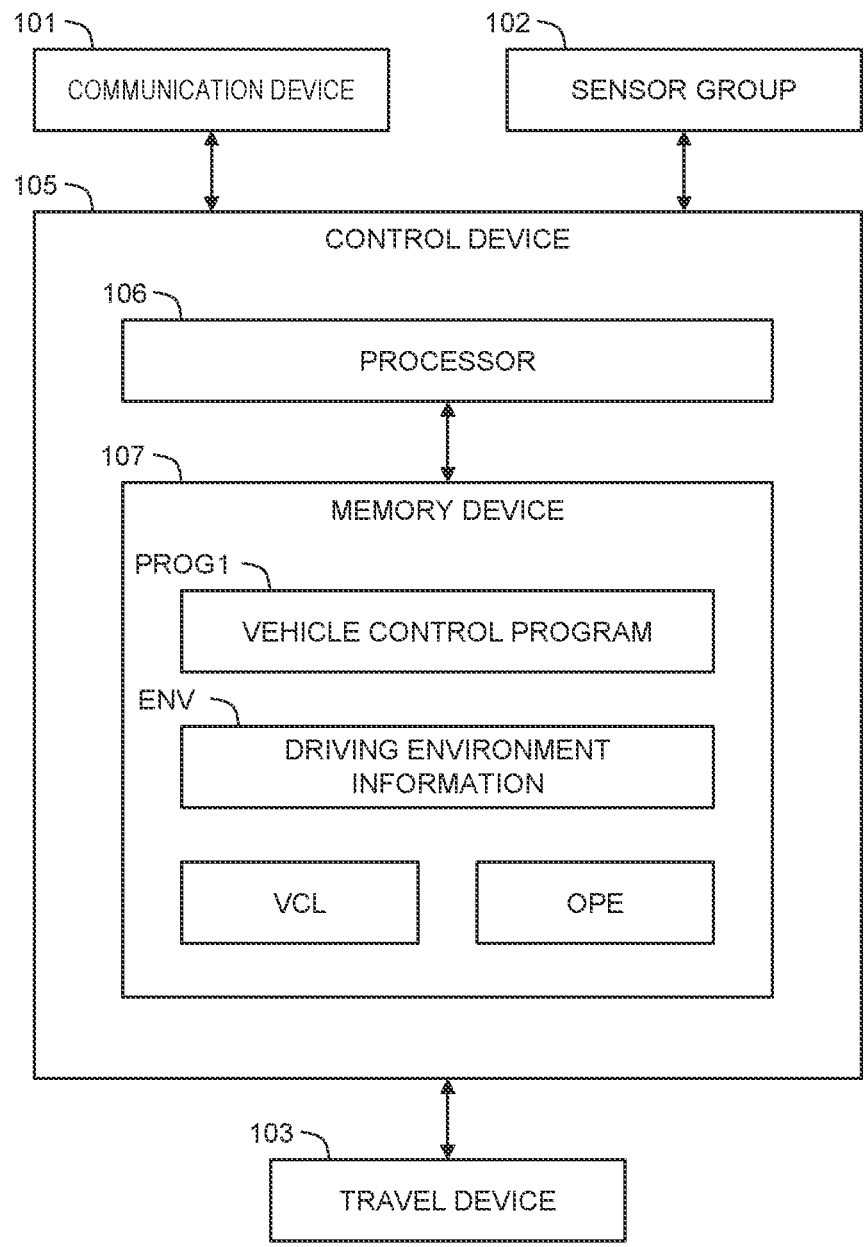
FIG. 2 is a block diagram showing a configuration example of a vehicle according to an embodiment of the present disclosure.

FIG. 1 is a schematic diagram showing a configuration example of a remote operation system 1 according to the present embodiment. The remote operation system 1 includes a vehicle 100, a remote operator terminal 200, and a management device 300. The vehicle 100 is the target of the remote operation. The remote operator terminal 200 is a terminal device used by a remote operator O when remotely operating the vehicle 100. The remote operator terminal 200 can also be referred to as a remote operation human machine interface (HMI). The management device 300 manages the remote operation system 1. The management of the remote operation system 1 includes, for example, assigning a remote operator O to a vehicle 100 that requires the remote operation. The management device 300 is able to communicate with the vehicle 100 and the remote operator terminal 200 via a communication network. Typically, the management device 300 is a management server on a cloud. The management server may be configured by a plurality of servers that perform distributed processing.

Various sensors including a camera are installed on the vehicle 100. The camera images a situation around the vehicle 100 to acquire image information indicating the situation around the vehicle 100. Vehicle information VCL is information acquired by the various sensors and includes the image information captured by the camera. The vehicle 100 transmits the vehicle information VCL to the remote operator terminal 200 via the management device 300. That is, the vehicle 100 transmits the vehicle information VCL to the management device 300, and the management device 300 transfers the received vehicle information VCL to the remote operator terminal 200.

The remote operator terminal 200 receives the vehicle information VCL transmitted from the vehicle 100. The remote operator terminal 200 presents the vehicle information VCL to the remote operator O. More specifically, the remote operator terminal 200 includes a display device, and displays the image information and the like on the display device. The remote operator O views the displayed information, recognizes the situation around the vehicle 100, and performs remote operation of the vehicle 100. The remote operation information OPE is information relating to remote operation by the remote operator O. For example, the remote operation information OPE includes an amount of operation performed by the remote operator O. The remote operator terminal 200 transmits the remote operation information OPE to the vehicle 100 via the management device 300. That is, the remote operator terminal 200 transmits the remote operation information OPE to the management device 300, and the management device 300 transfers the received remote operation information OPE to the vehicle 100.

The vehicle 100 receives the remote operation information OPE transmitted from the remote operator terminal 200. The vehicle 100 performs vehicle travel control in accordance with the received remote operation information OPE. In this manner, the remote operation of the vehicle 100 is realized.

2. EXAMPLE OF VEHICLE

2-1. Configuration Example

Figure 4:
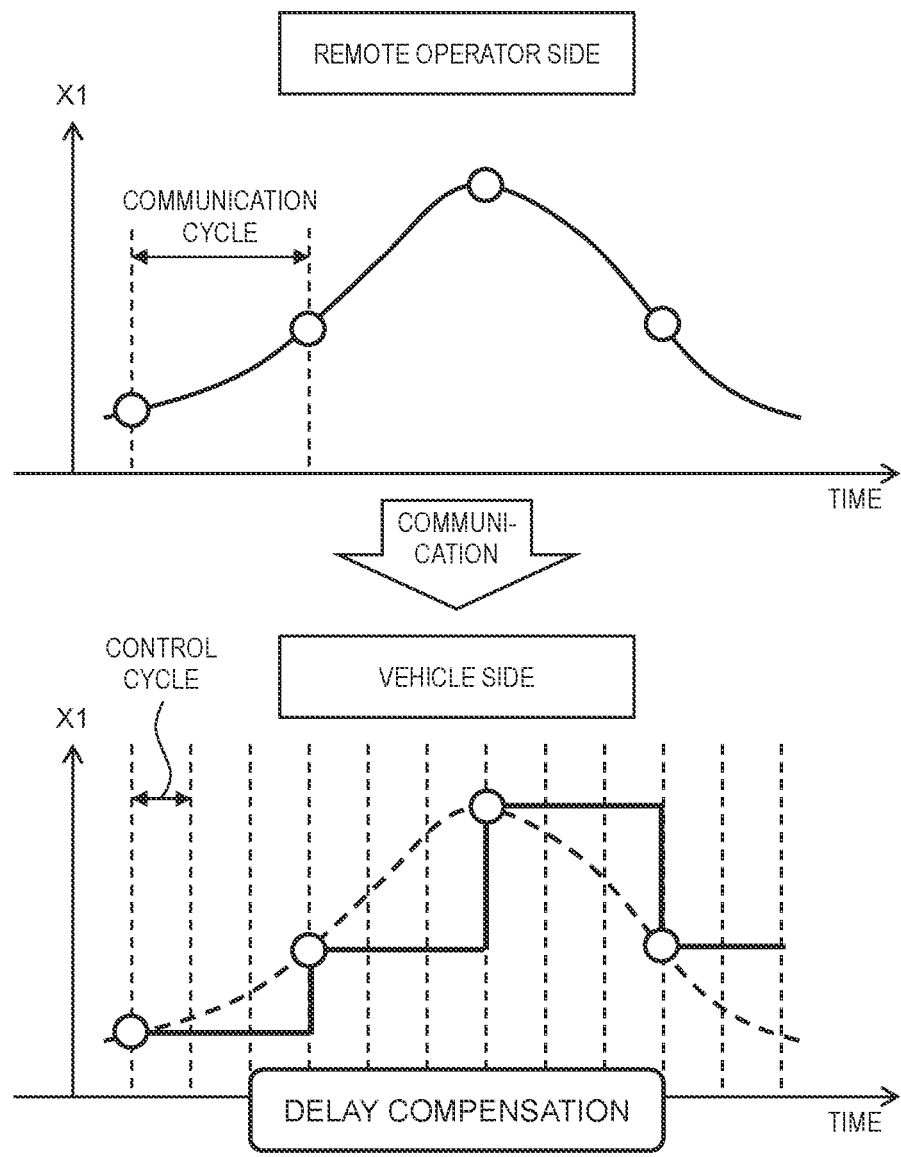
FIG. 4 is a conceptual diagram for explaining a delay compensation process in a vehicle according to an embodiment of the present disclosure.

FIG. 4 is a block diagram showing a configuration example of the vehicle 100. The vehicle 100 includes a communication device 101, a sensor group 102, a travel device 103, and a control device (controller) 105.

The communication device 101 communicates with the outside of the vehicle 100. For example, the communication device 101 communicates with the remote operator terminal 200 and the management device 300.

The sensor group 102 includes a recognition sensor, a vehicle state sensor, a position sensor, and the like. The recognition sensor recognizes (detects) a situation around the vehicle 100. Examples of the recognition sensor include the camera, a laser imaging detection and ranging (LIDAR), a radar, and the like. The vehicle state sensor detects a state of the vehicle 100. Examples of the vehicle state sensor include a speed sensor, an acceleration sensor, a yaw rate sensor, a steering angle sensor, and the like. The position sensor detects a position and an orientation of the vehicle 100. For example, the position sensor includes a global navigation satellite system (GNSS).

The travel device 103 includes a steering device, a driving device, and a braking device. The steering device turns wheels. For example, the steering device includes an electric power steering (EPS) device. The driving device is a power source that generates a driving force. Examples of the drive device include an engine, an electric motor, an in-wheel motor, and the like. The braking device generates a braking force.

The control device 105 is a computer that controls the vehicle 100. The control device 105 includes one or more processors 106 (hereinafter simply referred to as a processor 106) and one or more memory devices 107 (hereinafter simply referred to as a memory device 107). The processor 106 executes a variety of processing. For example, the processor 106 includes a central processing unit (CPU). The memory device 107 stores a variety of information necessary for the processing by the processor 106. Examples of the memory device 107 include a volatile memory, a non-volatile memory, a hard disk drive (HDD), a solid state drive (SSD), and the like. The control device 105 may include one or more electronic control units (ECUs).

A vehicle control program PROG1 is a computer program executed by the processor 106. The functions of the control device 105 are implemented by the processor 106 executing the vehicle control program PROG1. The vehicle control program PROG1 is stored in the memory device 107. The vehicle control program PROG1 may be recorded on a non-transitory computer-readable recording medium.

2-2. Driving Environment Information

The control device 105 uses the sensor group 102 to acquire driving environment information ENV indicating a driving environment for the vehicle 100. The driving environment information ENV is stored in the memory device 107.

The driving environment information ENV includes surrounding situation information indicating a result of recognition by the recognition sensor. For example, the surrounding situation information includes the image information captured by the camera. The surrounding situation information further includes object information regarding an object around the vehicle 100. Examples of the object around the vehicle 100 include a pedestrian, another vehicle (e.g., a preceding vehicle, a parked vehicle, etc.), a white line, a traffic signal, a sign, a roadside structure, and the like. The object information indicates a relative position and a relative velocity of the object with respect to the vehicle 100.

In addition, the driving environment information ENV includes vehicle state information indicating the vehicle state detected by the vehicle state sensor.

Furthermore, the driving environment information ENV includes vehicle position information indicating the position and the orientation of the vehicle 100. The vehicle position information is acquired by the position sensor. Highly accurate vehicle position information may be acquired by performing a well-known localization using map information and the surrounding situation information (the object information).

2-3. Vehicle Travel Control

The control device 105 executes vehicle travel control that controls travel of the vehicle 100. The vehicle travel control includes steering control, driving control, and braking control. The control device 105 executes the vehicle travel control by controlling the travel device 103 (i.e., the steering device, the driving device, and the braking device).

The control device 105 may execute autonomous driving control based on the driving environment information ENV. More specifically, the control device 105 generates a travel plan of the vehicle 100 based on the driving environment information ENV. Further, the control device 105 generates, based on the driving environment information ENV, a target trajectory required for the vehicle 100 to travel in accordance with the travel plan. The target trajectory includes a target position and a target speed. Then, the control device 105 executes the vehicle travel control such that the vehicle 100 follows the target trajectory.

2-4. Processing Related to Remote Operation

Hereinafter, the case where the remote operation of the vehicle 100 is performed will be described. The control device 105 communicates with the remote operator terminal 200 via the communication device 101.

The control device 105 transmits the vehicle information VCL to the remote operator terminal 200. The vehicle information VCL is information necessary for the remote operation by the remote operator O, and includes at least a part of the driving environment information ENV described above. For example, the vehicle information VCL includes the surrounding situation information (especially, the image information) The vehicle information VCL may further include the vehicle state information and the vehicle position information.

In addition, the control device 105 receives the remote operation information OPE from the remote operator terminal 200. The remote operation information OPE is information regarding the remote operation by the remote operator O. For example, the remote operation information OPE includes an amount of operation performed by the remote operator O. The control device 105 performs the vehicle travel control in accordance with the received remote operation information OPE.

Hereinafter, improvement in safety of the remote operation of the vehicle 100 will be described in detail.

3. DELAY COMPENSATION PROCESS AND UPSAMPLING PROCESS

3-1. Overview

First, a problem to be examined in this section will be described with reference to a comparative example shown in FIG. 3. A horizontal axis represents time, and a vertical axis represents the operation amount caused by the remote operator O. The operation amount caused by the remote operator O is hereinafter referred to as a "first operation amount X1." The first operation amount X1 is included in the remote operation information OPE transmitted from the remote operator terminal 200 to the vehicle 100. The control device 105 of the vehicle 100 performs the vehicle travel control in accordance with the first operation amount X1 included in the received remote operation information OPE.

Figure 3:
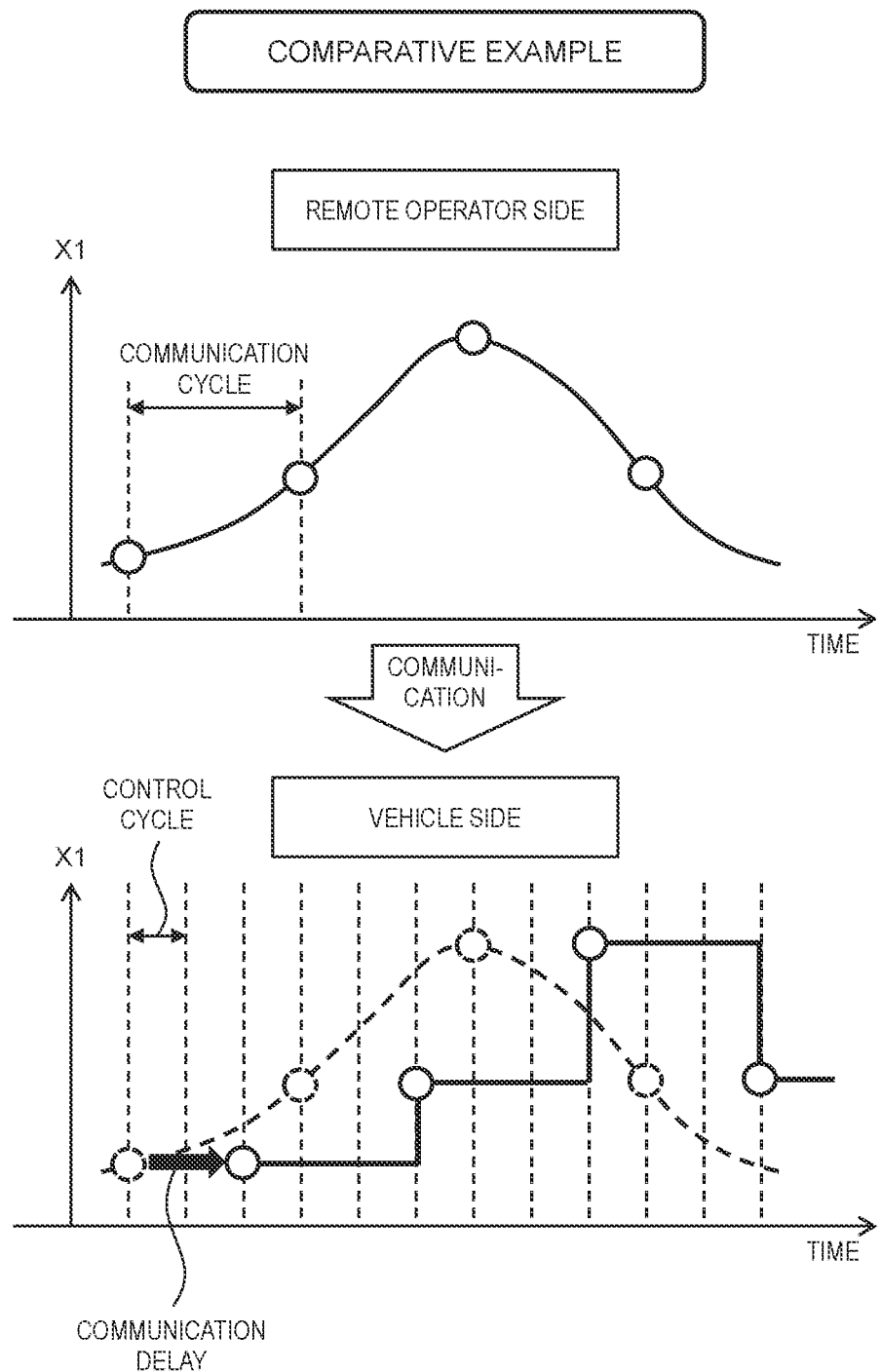
FIG. 3 is a conceptual diagram for explaining a problem.

An upper diagram of FIG. 3 illustrates a time variation of the first operation amount X1 on the remote operator O side. A circle in the upper diagram indicates the first operation amount X1 to be transmitted to the vehicle 100 and a transmission timing thereof. On the other hand, a lower diagram illustrates a time variation of the first operation amount X1 used for the control in the vehicle 100. A circle in the lower diagram indicates the first operation amount X1 received by the vehicle 100 and a reception timing thereof.

A first problem is a delay of the communication from the remote operator terminal 200 to the vehicle 100. A delay amount DL of the communication is not constant but varies depending on the communication state. As shown in FIG. 3, the first operation amount X1 on the vehicle 100 side is delayed from the first operation amount X1 on the remote operator O side by the delay amount DL. That is, it takes at least the time of the delay amount DL for the first operation amount X1 input by the remote operator O to be actually reflected in the vehicle control. As a result, the remote operation of the vehicle 100 by the remote operator O may be awkward. In some cases, the vehicle 100 may meander. These are undesirable from the viewpoint of the safety of the remote operation of the vehicle 100.

A second problem is a difference between a communication cycle and a control cycle. In general as shown in FIG. 3, the communication cycle of the remote operation information OPE (i.e., the first operation amount X1) is longer than the control cycle for controlling the vehicle 100. In other words, a control frequency of controlling the vehicle 100 is higher than a communication frequency of the remote operation information OPE. Therefore, the first operation amount X1 used for the controlling in the vehicle 100 deviates from an actual first operation amount X1 input by the remote operator O. The deviation of the first operation amount X1 increases as the difference between the communication cycle and the control cycle increases. Further, the deviation of the first operation amount X1 increases as the delay amount DL of the communication increases. Such the deviation of the first operation amount X1 may also cause the awkward remote operation of the vehicle 100 by the remote operator O. In some cases, the vehicle 100 may meander. These are undesirable from the viewpoint of the safety of the remote operation of the vehicle 100.

The vehicle 100 according to the present embodiment is configured to solve at least one of the problems described above.

FIG. 4 is a conceptual diagram for explaining a "delay compensation process" in the vehicle 100 according to the present embodiment. The control device 105 of the vehicle 100 is configured to compensate for the delay of the first operation amount X1 on the vehicle 100 side. More specifically, the control device 105 acquires information of the delay amount DL of the communication based on a result of reception of the remote operation information OPE from the remote operator terminal 200. Then, the control device 105 compensates for the delay of the first operation amount X1 based on the delay amount DL. This process is the delay compensation process. The control device 105 controls the vehicle 100 based on the first operation amount X1 after the delay compensation process. The first problem is solved by the delay compensation process. It should be noted that a specific example of the delay compensation process will be described later.

Figure 5:
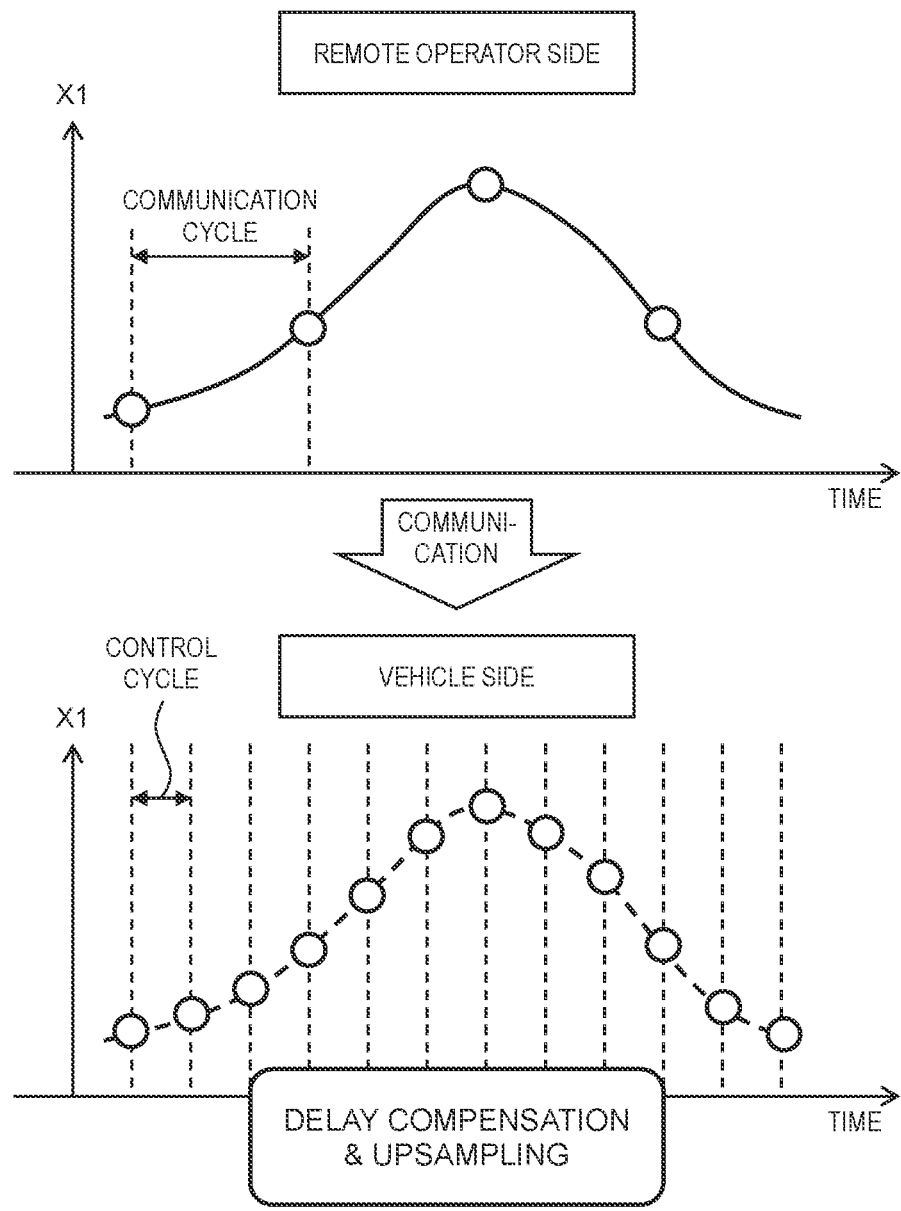
FIG. 5 is a conceptual diagram for explaining a delay compensation process and an upsampling process in a vehicle according to an embodiment of the present disclosure.

FIG. 5 is a conceptual diagram for explaining an "upsampling process" in the vehicle 100 according to the present embodiment. The control device 105 of the vehicle 100 is configured to increase a sampling frequency (sampling rate) of the first operation amount X1 by estimating (predicting) the first operation amount X1 in a non-sampling period. This process is the upsampling process. In particular, the control device 105 may perform the upsampling process such that a difference between the sampling cycle (the sampling frequency) of the first operation amount X1 and the control cycle (the control frequency) becomes smaller than the difference between the communication cycle (the communication frequency) and the control cycle (the control frequency). For example, the control device 105 performs the upsampling process such that the sampling cycle (the sampling frequency) of the first operation amount X1 coincides with the control cycle (the control frequency). The second problem is solved by the upsampling process. It should be noted that a specific example of the upsampling process will be described later.

The control device 105 of the vehicle 100 according to the present embodiment is configured to execute at least one of the delay compensation process and the upsampling process. The control device 105 may be configured to perform both the delay compensation process and the upsampling process. As a result, the remote operator O is able to perform the remote operation of the vehicle 100 more smoothly and more safely. The meandering of the vehicle 100 also is suppressed. That is, according to the present embodiment, the safety of the remote operation of the vehicle 100 is improved.

3-2. Functional Configuration Example

Figure 6:
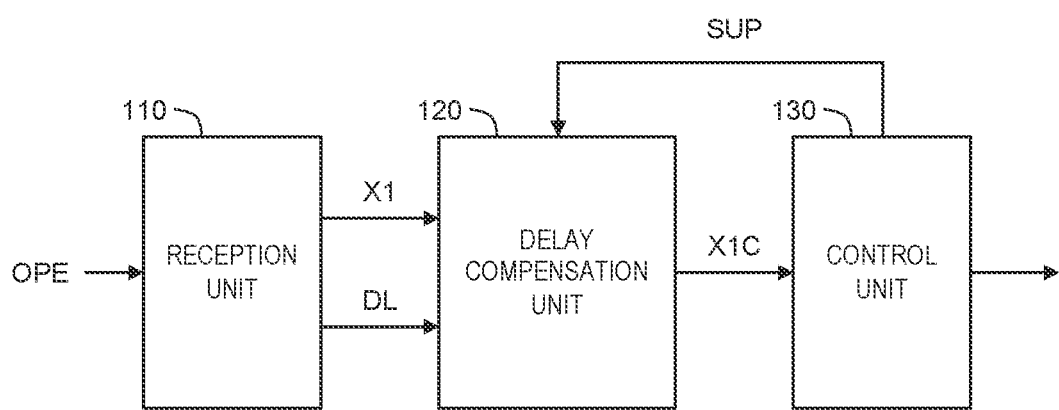
FIG. 6 is a block diagram showing an example of a functional configuration related to a delay compensation process in a vehicle according to the embodiment of the present disclosure.

FIG. 6 is a block diagram showing an example of a functional configuration related to the delay compensation process in the vehicle 100. The vehicle 100 includes, as functional blocks, a reception unit 110, a delay compensation unit 120, and a control unit 130. These functional blocks are realized by the communication device 101 and the control device 105.

The reception unit 110 receives the remote operation information OPE transmitted from the remote operator terminal 200 during the remote operation of the vehicle 100. The remote operation information OPE includes information on the first operation amount X1 caused by the remote operator O. The reception unit 110 grasps a state of the communication with the remote operator terminal 200 based on a result of reception of the remote operation information OPE. Examples of the communication state include presence or absence of data reception, the delay amount DL, a transmission speed, a radio wave reception intensity, and the like.

The delay compensation unit 120 executes the delay compensation process. More specifically, the delay compensation unit 120 acquires the information on the first operation amount X1 and the delay amount DL from the reception unit 110. The delay amount DL is not constant but varies depending on the communication state. The delay compensation unit 120 compensates for the delay of the first operation amount X1 based on the delay amount DL. Hereinafter, the first operation amount X1 whose delay is compensated for is referred to as a "first correction operation amount X1C." It can be said that the delay compensation unit 120 calculates the first correction operation amount X1C by compensating for the delay of the first operation amount X1 based on the delay amount DL. The delay compensation unit 120 may perform the delay compensation process while performing the upsampling process. A specific example of the delay compensation unit 120 will be described in the following Section 3-3.

The control unit 130 receives the first correction operation amount X1C after the delay compensation process. The control unit 130 performs the vehicle travel control in accordance with the first correction operation amount X1C.

3-3. Example of Delay Compensation Unit

Figure 7:
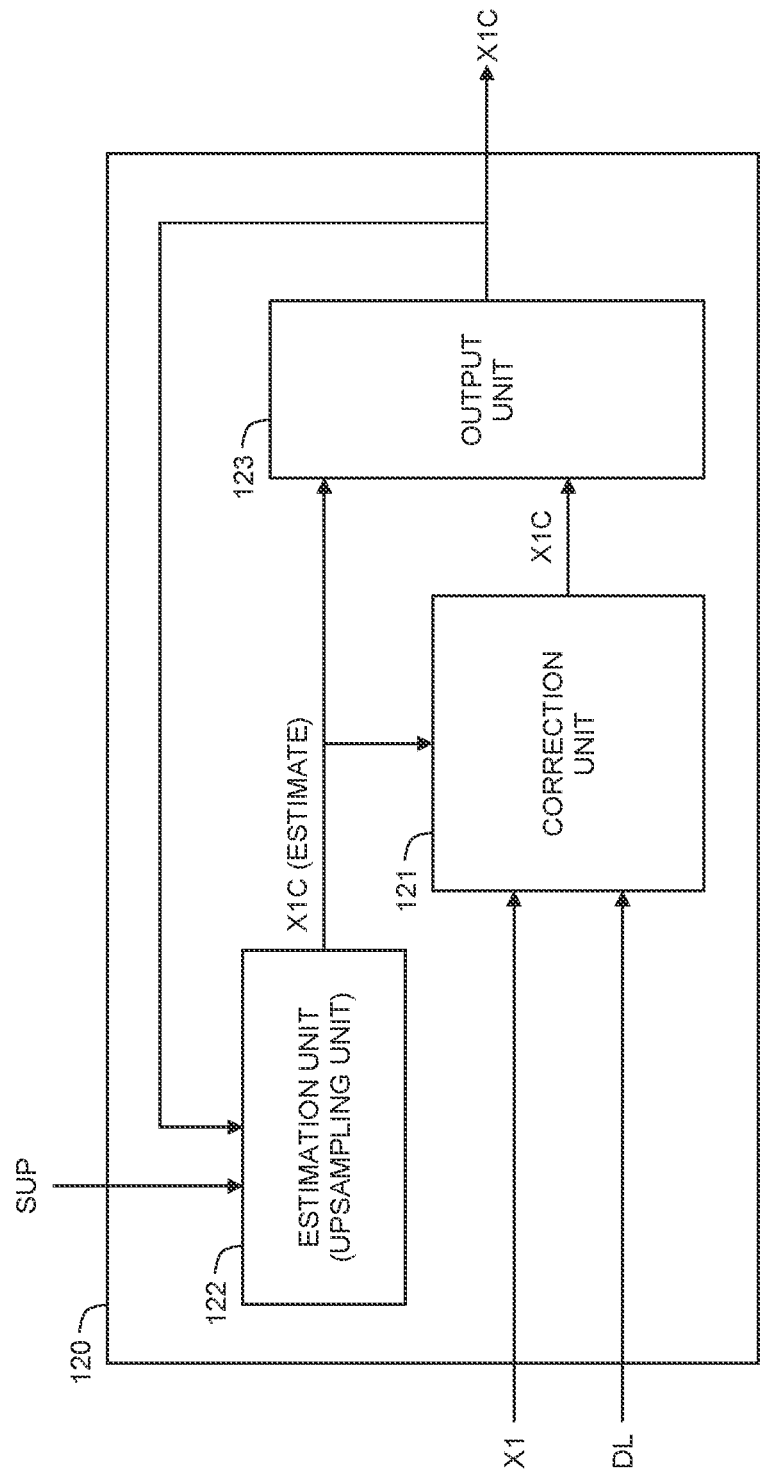
FIG. 7 is a block diagram showing a configuration example of a delay compensation unit according to an embodiment of the present disclosure.

FIG. 7 is a block diagram showing a configuration example of the delay compensation unit 120. The delay compensation unit 120 shown in FIG. 7 is configured to perform the delay compensation process while performing the upsampling process. More specifically, the delay compensation unit 120 includes a correction unit 121, an estimation unit 122, and an output unit 123.

The correction unit 121 acquires the information of the first operation amount X1 caused by the remote operator O that is received from the remote operator terminal 200. Moreover, the correction unit 121 acquires information on the delay amount DL. The delay amount DL is not constant but varies depending on the communication state. The correction unit 121 performs the delay compensation process based on the first operation amount X1 and the delay amount DL to calculate the first correction operation amount X1C. The output unit 123 outputs the first correction operation amount X1C.

The estimation unit 122 estimates (predicts) the first correction operation amount X1C in the non-sampling period based on the first correction operation amount X1C output from the output unit 123. That is, the estimation unit 122 performs the upsampling process. In particular, the estimation unit 122 performs the upsampling process such that a difference between the sampling frequency of the first correction operation amount X1C and the control frequency becomes smaller than the difference between the communication frequency and the control frequency.

For example, the estimation unit 122 holds an equation of motion representing a motion of the vehicle 100. An estimate value of the first correction operation amount X1C output from the estimation unit 122 is fed back to the estimation unit 122 through the output unit 123. The estimation unit 122 estimates (predicts) a first correction operation amount X1C of the next timing based on the equation of motion and the fed-back estimate value of the first correction operation amount X1C. However, the estimate value of the first correction operation amount X1C includes an error. The error is corrected by the correction unit 121.

More specifically, the estimate value of the first correction operation amount X1C output from the estimation unit 122 is also input to the correction unit 121. Meanwhile, the first operation amount X1 (actual value) caused by the remote operator O that is received from the remote operator terminal 200 is also input to the correction unit 121. Since the communication cycle is longer than the control cycle and the control frequency is higher than the communication frequency as described above, the first operation amount X1 (actual value) is input to the correction unit 121 at a lower frequency than the estimate value of the first correction operation amount X1C. The correction unit 121 calculates the first correction operation amount X1C by correcting the estimate value of the first correction operation amount X1C based on the first operation amount X1 (actual value) while performing the delay compensation process based on the delay amount DL. The first correction operation amount X1C calculated by the correction unit 121 is fed back to the estimation unit 122 through the output unit 123. The estimation unit 122 performs the upsampling process based on the first correction operation amount X1C output from the output unit 123.

As described above, the delay compensation unit 120 shown in FIG. 7 performs the delay compensation process while performing the upsampling process. The delay compensation unit 120 estimates the first correction operation amount X1C in the non-sampling period by feeding back the estimate value of the first correction operation amount X1C acquired by the upsampling process and the first correction operation amount X1 acquired by the delay compensation process. Further, the delay compensation unit 120 calculates the first correction operation amount X1C by correcting the estimate value of the first correction operation amount X1C based on the first operation amount X1 (actual value) while performing the delay compensation process based on the delay amount DL.

The delay compensation unit 120 performing the upsampling process and the delay compensation process can be realized by using, for example, a delayed Kalman filter. The delayed Kalman filter is also called OOSM (Out-of-Sequence Measurement). For details of the delayed Kalman filter, refer to Non-Patent Literature 1 and Non-Patent Literature 2. The delayed Kalman filter can be applied also to the first operation amount X1 whose delay amount DL varies. The delay compensation unit 120 executes the upsampling process and the delay compensation process by applying a delayed Kalman filter to the first operation amount X1 whose delay amount DL varies.

Supplementary information SUP may be used for improving accuracy of the estimation of the first correction operation amount X1C by the estimation unit 122. For example, the supplementary information SUP includes a shape of a road on which the vehicle 100 moves. For example, when the vehicle 100 travels on a curved road, information on the shape of the curved road is used for estimating a future operation amount. The road shape is acquired, for example, from the surrounding situation information. Alternatively, the road shape may be acquired from the vehicle position information and map information. The supplementary information SUP may include a vehicle travel control amount which is a control amount of the travel device 103 (actuators) of the vehicle 100. The vehicle travel control amount also is useful for the estimation process by the estimation unit 122. The supplementary information SUP is provided from the control unit 130 to the delay compensation unit 120. The estimation unit 122 estimates (predicts) the first correction operation amount X1C in consideration of the supplementary information SUP. Thus, the estimation accuracy of the first correction operation amount X1C is further improved.

3-4. Effects

As described above, the control device 105 of the vehicle 100 according to the present embodiment is configured to execute at least one of the delay compensation process and the upsampling process. The control device 105 may be configured to perform both the delay compensation process and the upsampling process. As a result, the remote operator O is able to perform the remote operation of the vehicle 100 more smoothly and more safely. The meandering of the vehicle 100 also is suppressed. That is, according to the present embodiment, the safety of the remote operation of the vehicle 100 is improved.

4. ABNORMALITY DETERMINATION PROCESS AND OPERATION AMOUNT COORDINATING PROCESS

4-1. Overview

Next, an "abnormality" that may occur in the remote operation system 1 will be considered. The abnormality is a concept including failure, malfunction, insufficiency, and trouble. Examples of the abnormality in the remote operation system 1 include a "communication abnormality" that is an abnormality in the communication between the vehicle 100 and the remote operator terminal 200, a "vehicle abnormality" that is an abnormality in the vehicle 100, and a "terminal abnormality" that is an abnormality in the remote operator terminal 200.

Figure 8:
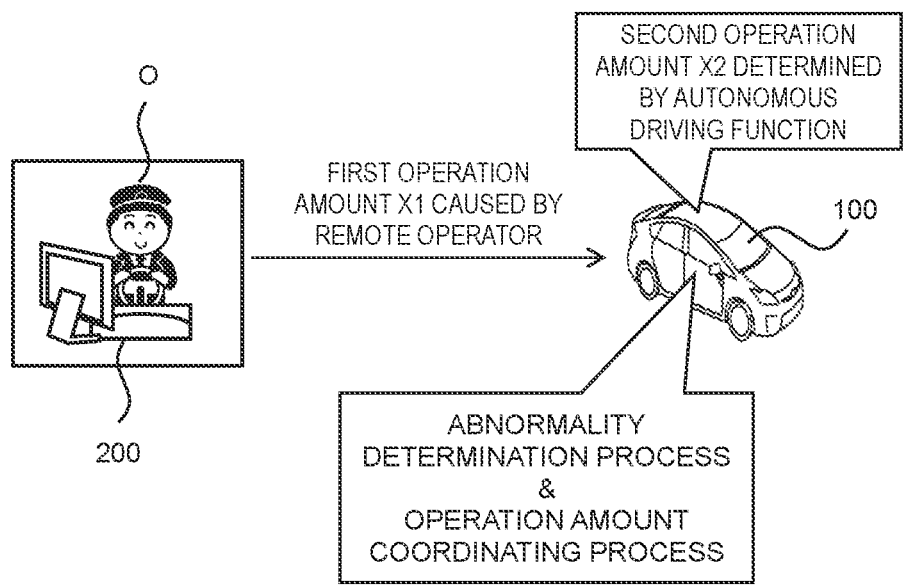
FIG. 8 is a conceptual diagram for explaining an abnormality determination process and an operation amount coordinating process in a vehicle according to the embodiment of the present disclosure.

FIG. 8 is a conceptual diagram for explaining processing related to the abnormality in the remote operation system 1. The control device 105 of vehicle 100 according to the present embodiment executes an "abnormality determination process" that determines whether or not the abnormality occurs in the remote operation system 1. In particular, the control device 105 makes the determination while distinguishing the communication abnormality, the vehicle abnormality, and the terminal abnormality from each other. That is, the control device 105 determines whether or not at least one of the communication abnormality, the vehicle abnormality, and the user equipment abnormality occurs.

When the abnormality occurs during the remote operation of the vehicle 100, it is desirable to appropriately control the vehicle 100 to secure safety. Here, it is not always appropriate to control the vehicle 100 in accordance with the first operation amount X1 caused by the remote operator O. The reason is that, for example, when the terminal abnormality occurs, the first operation amount X1 transmitted from the remote operator terminal 200 may be abnormal. In some cases, it may be safer to delegate the vehicle driving to the autonomous driving function (autonomous travel function) of the vehicle 100.

In view of the above, the control device 105 of the vehicle 100 according to the present embodiment executes an "operation amount coordinating process" that appropriately determines a final operation amount X according to a state of the abnormality. The first operation amount X1 is an operation amount caused by the remote operator O and is included in the remote operation information OPE. On the other hand, a second operation amount X2 is an operation amount determined (required) by the autonomous driving function of the vehicle 100. In the operation amount coordinating process, the control device 105 determines a "final operation amount X" based on at least one of the first operation amount X1 and the second operation amount X2 according to a result of the abnormality determination process (that is, the state of the abnormality). Then, the control device 105 controls the vehicle 100 in accordance with the determined operation amount X.

For example, when the terminal abnormality occurs, the safety is improved by controlling the vehicle 100 in accordance with the second operation amount X2 instead of the first operation amount X1. As another example, when the communication abnormality occurs, the safety is improved by controlling the vehicle 100 in accordance with the second operation amount X2 instead of the first operation amount X1.

As described above, according to the present embodiment, the control device 105 of the vehicle 100 is configured to execute the abnormality determination process and the operation amount coordinating process. In the operation amount coordinating process, the control device 105 determines the "final operation amount X" based on at least one of the first operation amount X1 and the second operation amount X2 according to the result of the abnormality determination process. Then, the vehicle 100 is controlled in accordance with the determined operation amount X. It is thus possible to appropriately control the vehicle 100 in consideration of the state of the abnormality when the abnormality occurs in the remote operation system 1.

4-2. Functional Configuration Example

Figure 9:
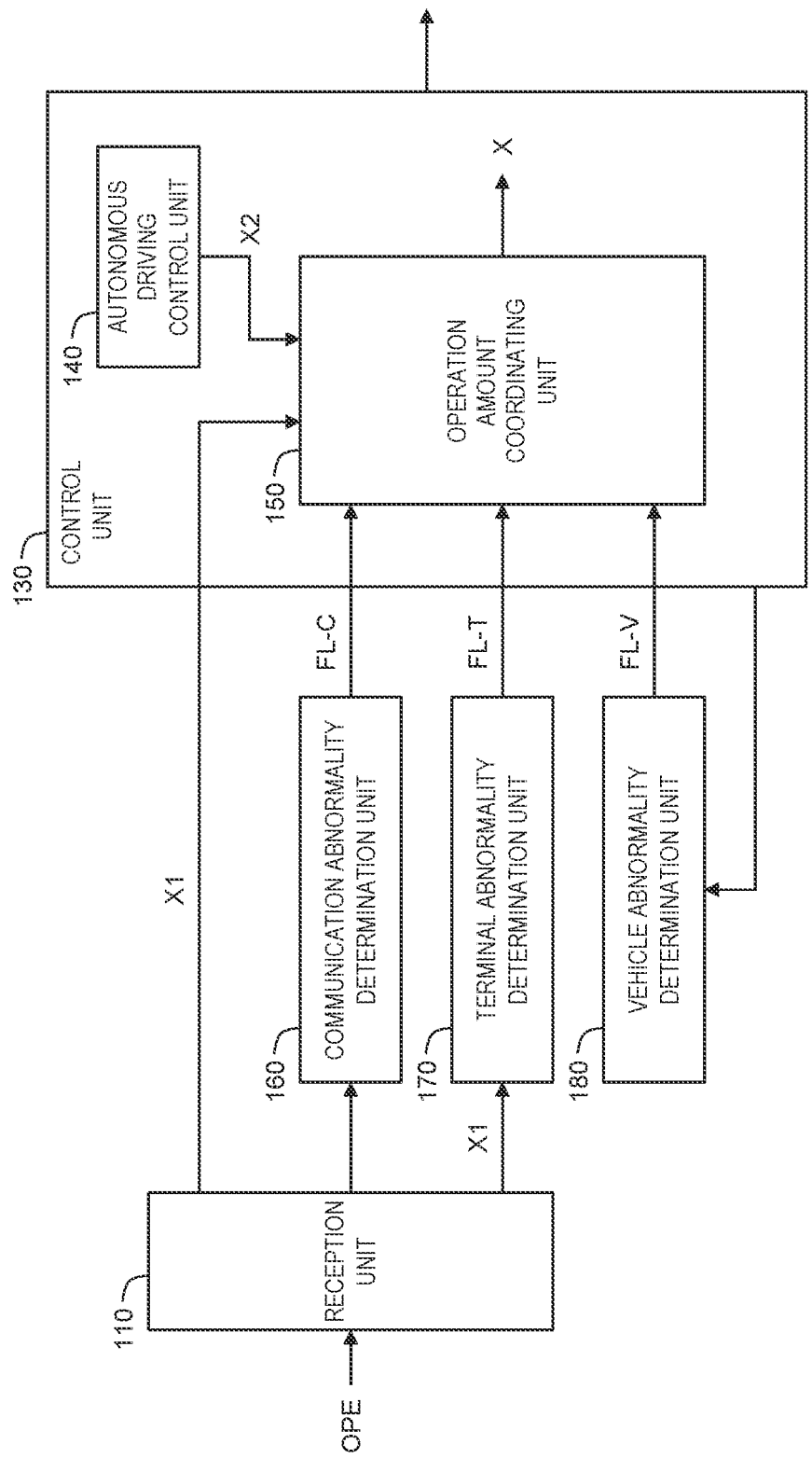
FIG. 9 is a block diagram showing an example of a functional configuration related to an abnormality determination process and an operation amount coordinating process in a vehicle according to an embodiment of the present disclosure.

FIG. 9 is a block diagram showing an example of a functional configuration related to the abnormality determination process and the operation amount coordinating process in the vehicle 100. The vehicle 100 includes, as functional blocks, a reception unit 110, a control unit 130, a communication abnormality determination unit 160, a terminal abnormality determination unit 170, and a vehicle abnormality determination unit 180. These functional blocks are realized by the communication device 101 and the control device 105.

The reception unit 110 receives the remote operation information OPE transmitted from the remote operator terminal 200 during the remote operation of the vehicle 100. The remote operation information OPE includes information on the first operation amount X1 caused by the remote operator O. The reception unit 110 grasps a state of the communication with the remote operator terminal 200 based on a result of reception of the remote operation information OPE. Examples of the communication state include presence or absence of data reception, the delay amount DL, a transmission speed, a radio wave reception intensity, and the like.

The control unit 130 receives the information on the first operation amount X1 through the reception unit 110. Moreover, the control unit 130 includes an autonomous driving control unit 140 and an operation amount coordinating unit 150. The autonomous driving control unit 140 performs the above-described autonomous driving control based on the driving environment information ENV. An operation amount required by the autonomous driving control is the second operation amount X2. The operation amount coordinating unit 150 executes the operation amount coordinating process. That is, the operation amount coordinating unit 150 determines the "final operation amount X" based on at least one of the first operation amount X1 and the second operation amount X2.

The communication abnormality determination unit 160 performs a "communication abnormality determination process." More specifically, the communication abnormality determination unit 160 acquires information on the communication state from the reception unit 110. Then, the communication abnormality determination unit 160 determines, based on the communication state, whether or not an abnormality occurs in the communication from the remote operator terminal 200 to the vehicle 100. A specific example of the communication abnormality determination process will be described later (see Section 4-3). A communication abnormality flag FL-C is information indicating a result of the communication abnormality determination process. The communication abnormality determination unit 160 outputs the communication abnormality flag FL-C to the operation amount coordinating unit 150.

The terminal abnormality determination unit 170 performs a "terminal abnormality determination process." More specifically, the terminal abnormality determining unit 170 determines whether or not an abnormality occurs in the remote operator terminal 200 based on the first operation amount X1 included in the remote operation information OPE. A specific example of the terminal abnormality determination process will be described later (see Section 4-4). A terminal abnormality flag FL-T is information indicating a result of the terminal abnormality determination process. The terminal abnormality determination unit 170 outputs the terminal abnormality flag FL-T to the operation amount coordinating unit 150.

The vehicle abnormality determination unit 180 performs a "vehicle abnormality determination process." More specifically, the vehicle abnormality determination unit 180 receives information on a vehicle travel control amount calculated by the control unit 130. Then, the vehicle abnormality determination unit 180 determines, based on the vehicle travel control amount, whether or not an abnormality occurs in the vehicle travel control. A specific example of the vehicle abnormality determination process will be described later (see Section 4-5). A vehicle abnormality flag FL-V is information indicating a result of the vehicle abnormality determination process. The vehicle abnormality determination unit 180 outputs the vehicle abnormality flag FL-V to the operation amount coordinating unit 150.

The operation amount coordinating unit 150 executes the operation amount coordinating process based on the variety of abnormality flags FL-C, FL-T, and FL-V. That is, the operation amount coordinating unit 150 executes the operation amount coordinating process according to the results of the variety of abnormality determination processes. A specific example of the operation amount coordinating process will be described later (see Section 4-6).

The control unit 130 controls the vehicle 100 in accordance with the final operation amount X output from the operation amount coordinating unit 150.

4-3. Example of Communication Abnormality Determination Process

Figure 10:
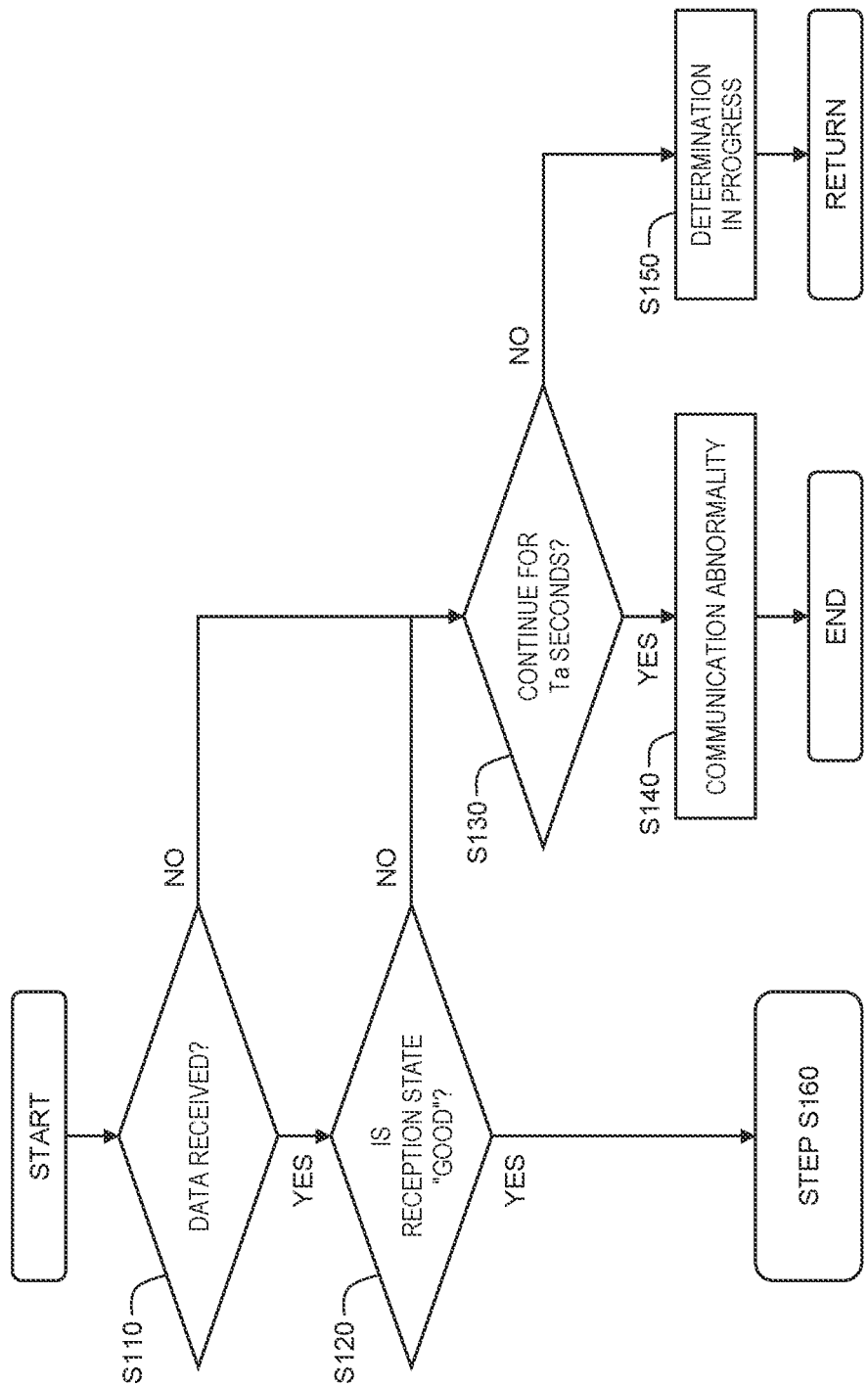
FIG. 10 is a flowchart showing an example of a communication abnormality determination process according to an embodiment of the present disclosure.

FIG. 10 is a flowchart showing an example of the communication abnormality determination process performed by the communication abnormality determination unit 160.

In Step S110, the communication abnormality determination unit 160 determines whether or not the reception unit 110 receives data. When the reception unit 110 receives data (Step S110; Yes), the processing proceeds to Step S120. Otherwise (Step S110; No), the processing proceeds to Step S130.

In Step S120, the communication abnormality determination unit 160 determines whether a reception state is good or not. The reception state is represented by a parameter such as the transmission speed, the radio wave reception intensity, and the like. When the parameter is equal to or greater than a predetermined threshold (Step S120; Yes), it is determined that the reception state is good, and the processing proceeds to Step S160. Otherwise (Step S120; No), the processing proceeds to Step S130.

In Step S130, the communication abnormality determination unit 160 determines whether or not the non-data reception state or the not-good reception state continues for Ta seconds. When such the bad state continues for Ta seconds (Step S130; Yes), the processing proceeds to Step S140. On the other hand, when such the bad state has not yet continued for Ta seconds (Step S130; No), the processing proceeds to Step S150.

In Step S140, the communication abnormality determination unit 160 determines (asserts) that the communication abnormality occurs.

In Step S150, the communication abnormality determination unit 160 sets a current state to "communication abnormality determination in progress" without confirming the determination. After that, the processing returns to Step S110.

Figure 11:
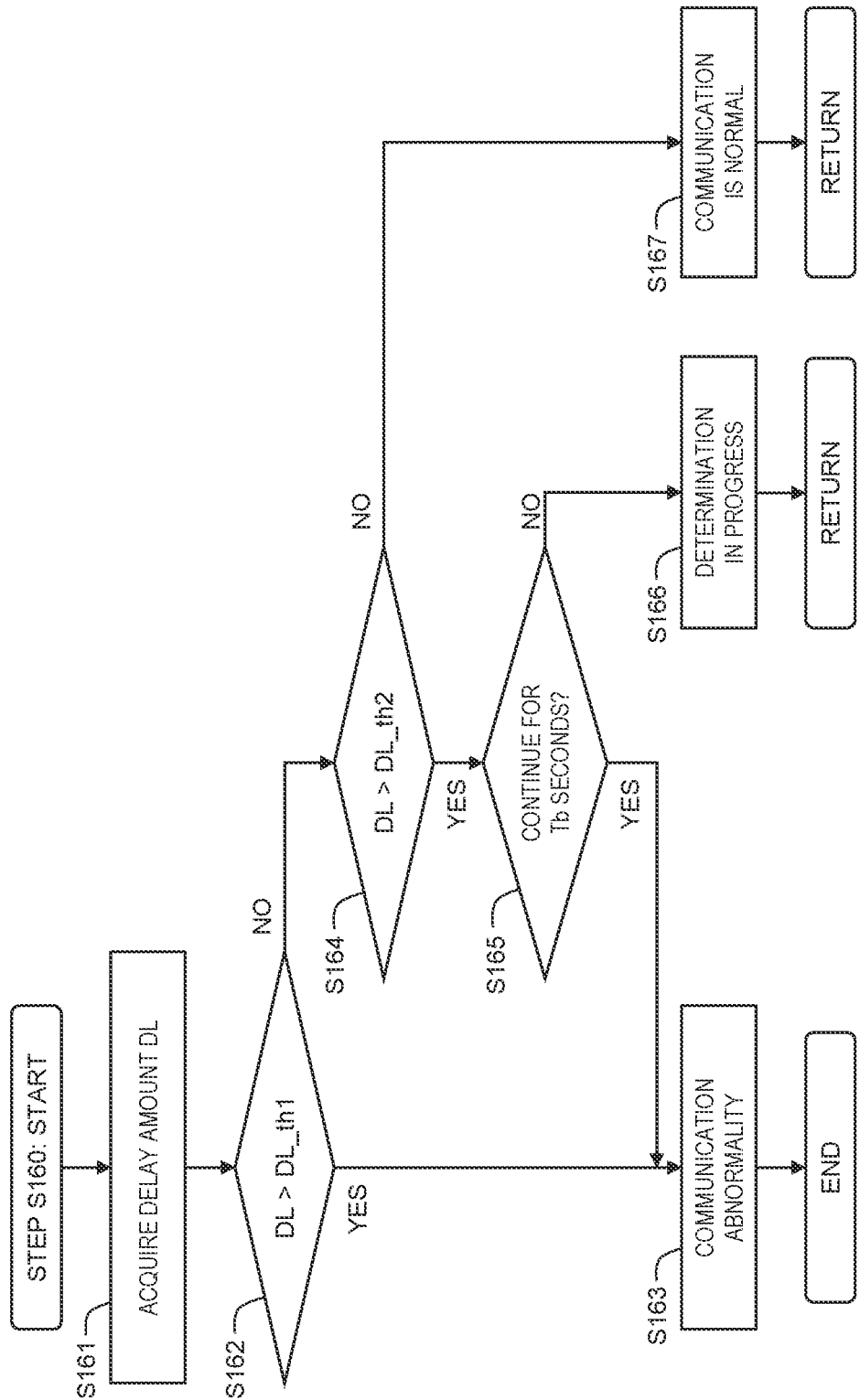
FIG. 11 is a flowchart showing an example of a communication abnormality determination process according to an embodiment of the present disclosure.

FIG. 11 is a flowchart showing an example of Step S160. In Step S160, a delay amount DL of the communication is taken into consideration.

In Step S161, the communication abnormality determination unit 160 acquires information on the delay amount DL of the communication from the reception unit 110.

In Step S162, the communication abnormality determination unit 160 determines whether or not the delay amount DL exceeds a first threshold value DL_th1. The first threshold value DL_th1 is a delay amount DL where it can be determined that the communication abnormality occurs. For example, the first threshold value DL_th1 is a delay amount DL that cannot normally occur. When the delay amount DL exceeds the first threshold value DL_th1 (Step S162; Yes), the processing proceeds to Step S163. On the other hand, when the delay amount DL is equal to or less than the first threshold value DL_th1 (Step S162; No), the processing proceeds to Step S164.

In Step S163, the communication abnormality determination unit 160 determines (asserts) that the communication abnormality occurs.

In Step S164, the communication abnormality determination unit 160 determines whether or not the delay amount DL exceeds a second threshold value DL_th2. The second threshold value DL_th2 is smaller than the first threshold value DL_th1 described above. For example, the second threshold value DL_th2 is an upper limit value of an allowable range of the delay amount DL. When the delay amount DL exceeds the second threshold value DL_th2 (Step S164 Yes), the processing proceeds to Step S165. On the other hand, when the delay amount DL is equal to or less than the second threshold value DL_th2 (Step S164; No), the processing proceeds to Step S167.

In Step S165, the communication abnormality determination unit 160 determines whether or not the state in which the delay amount DL exceeds the second threshold value DL_th2 continues for Tb seconds. When such the state continues for Tb seconds (Step S165; Yes), the processing proceeds to Step S163. On the other hand, when such the state has not yet continued for Tb seconds (Step S165; No), the processing proceeds to Step S166.

In Step S166, the communication abnormality determination unit 160 sets the current state to "communication abnormality determination in progress" without confirming the determination. After that, the processing returns to Step S110.

In Step S167, the communication abnormality determination unit 160 determines that no communication abnormality occurs and the communication is normal. After that, the processing returns to Step S110.

4-4. Example of Terminal Abnormality Determination Process

Figure 12:
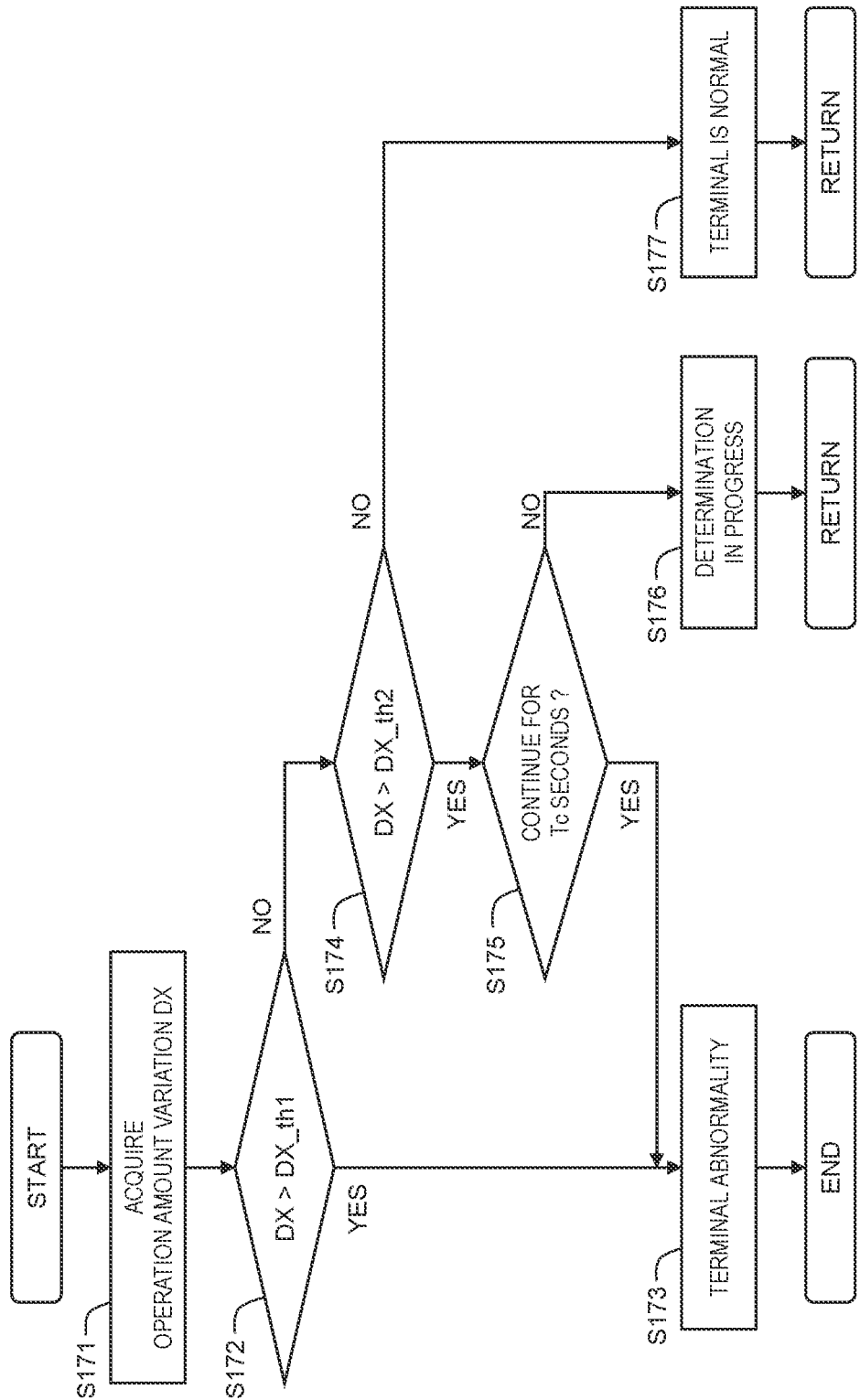
FIG. 12 is a flowchart showing an example of a terminal abnormality determination process according to an embodiment of the present disclosure.

FIG. 12 is a flowchart showing an example of the terminal abnormality determination process performed by the terminal abnormality determination unit 170.

In Step S171, the terminal abnormality determination unit 170 receives the remote operation information OPE. Then, the terminal abnormality determination unit 170 acquires an "operation amount variation DX" that is a variation from a previous value of the first operation amount X1 caused by the remote operator O.

In Step S172, the terminal abnormality determination unit 170 determines whether or not the operation amount variation DX exceeds a first threshold value DX_th1. The First threshold value DX_th1 is an operation amount variation DX where it can be determined that the terminal abnormality occurs. For example, the first threshold value DX_th1 is an operation amount variation DX that cannot normally occur. When the operation amount variation DX exceeds the First threshold value DX_th1 (Step S172; Yes), the processing proceeds to Step S173. On the other hand, when the operation amount variation DX is equal to or less than the first threshold value DX_th1 (Step S172; No), the processing proceeds to Step S174.

In Step S173, the terminal abnormality determination unit 170 determines (asserts) that the terminal abnormality occurs.

In Step S174, the terminal abnormality determination unit 170 determines whether or not the operation amount variation DX exceeds a second threshold value DX_th2. The second threshold value DX_th2 is smaller than the first threshold value DX_th1 described above. For example, the second threshold value DX_th2 is an upper limit value of an allowable range of the operation amount variation DX. When the operation amount variation DX exceeds the second threshold value DX_th2 (Step S174; Yes), the processing proceeds to Step S175. On the other hand, when the operation amount variation DX is equal to or less than the second threshold value DX_th2 (Step S174; No), the processing proceeds to Step S177.

In Step S175, the terminal abnormality determination unit 170 determines whether or not the state in which the operation amount variation DX exceeds the second threshold value DX_th2 continues for Tc seconds. When such the state continues for Tc seconds (Step S175; Yes), the processing proceeds to Step S173. On the other hand, when such the state has not yet continued for Tc seconds (Step S175; No), the processing proceeds to Step S176.

In Step S176, the terminal abnormality determination unit 170 sets the current state to "terminal abnormality determination in progress" without confirming the determination. After that, the processing returns to Step S171.

In Step S177, the terminal abnormality determination unit 170 determines that no terminal abnormality occurs and the remote operator terminal 200 is normal. After that, the processing returns to Step S171.

4-5. Example of Vehicle Abnormality Determination Process

Figure 13:
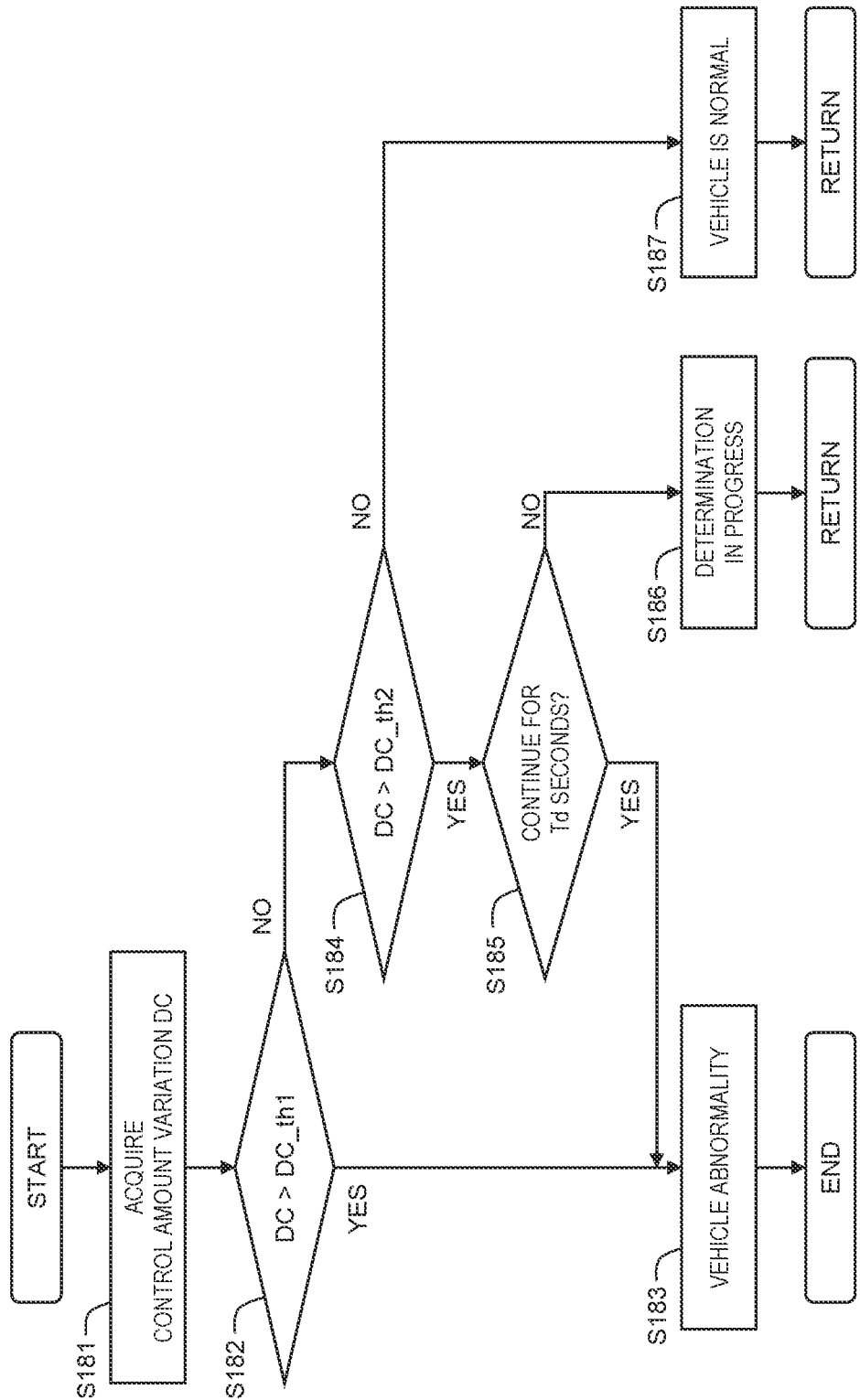
FIG. 13 is a flowchart showing an example of a vehicle abnormality determination process according to an embodiment of the present disclosure.

FIG. 13 is a flowchart showing an example of the vehicle abnormality determination process performed by the vehicle abnormality determination unit 180.

In Step S181, the vehicle abnormality determination unit 180 receives information on the vehicle travel control amount calculated by the control unit 130. Then, the vehicle abnormality determination unit 180 acquires a "control amount variation DC" that is a variation from a previous value of the vehicle travel control amount.

In Step S182, the vehicle abnormality determination unit 180 determines whether or not the control amount variation DC exceeds a first threshold value DC_th1. The first threshold value DC_th1 is a control amount variation DC where it can be determined that the vehicle abnormality occurs. For example, the first threshold value DC_th1 is a control amount variation DC that cannot normally occur. When the control amount variation DC exceeds the first threshold value DC_th1 (Step S182; Yes), the processing proceeds to Step S183. On the other hand, when the control amount variation DC is equal to or less than the first threshold value DC_th1 (Step S182; No), the processing proceeds to Step S184.

In Step S183, the vehicle abnormality determination unit 180 determines (asserts) that the vehicle abnormality occurs.

In Step S184, the vehicle abnormality determination unit 180 determines whether or not the control amount variation DC exceeds a second threshold value DC_th2. The second threshold value DC_th2 is smaller than the first threshold value DC_th1 described above. For example, the second threshold value DC_th2 is an upper limit value of an allowable range of the control amount variation DC. When the control amount variation DC exceeds the second threshold value DC_th2 (Step S184; Yes), the processing proceeds to Step S185. On the other hand, when the control amount variation DC is equal to or less than the second threshold value DC_th2 (Step S184; No), the processing proceeds to Step S187.

In Step S185, the vehicle abnormality determination unit 180 determines whether or not the state in which the control amount variation DC exceeds the second threshold value DC_th2 continues for Td seconds. When such the state continues for Td seconds (Step S185; Yes), the processing proceeds to Step S183. On the other hand, when such the state has not yet continued for Td seconds (Step S185; No), the processing proceeds to Step S186.

In Step S186, the vehicle abnormality determination unit 180 sets the current state to "vehicle abnormality determination in progress" without confirming the determination. After that, the processing returns to Step S181.

In Step S187, the vehicle abnormality determination unit 180 determines that no vehicle abnormality occurs and the vehicle 100 is normal. After that, the processing returns to Step S181.

4-6. Example of Operation Amount Coordinating Process

FIG. 14 is a diagram for explaining an example of the operation amount coordinating process performed by the operation amount coordinating unit 150. In FIG. 14, a circle indicates "normal (no abnormality occurs)", a cross indicates "abnormality confirmed (abnormality occurs)", and a triangle indicates "determination in progress." As exemplified in the above FIGS. 10 to 13, a period of determination-in-progress is a period after a provisional abnormality condition (e.g., Step S174 in FIG. 12, "DX>DX_th2") is satisfied and in which a state where the provisional abnormality condition is satisfied continues. In other words, the period of determination-in-progress is a period from when possibility of the occurrence of the abnormality is detected to when whether or not the abnormality occurs is determined.

The first operation amount X1 is an operation amount caused by the remote operator O. The second operation amount X2 is an operation amount determined by the autonomous driving function of the vehicle 100 in a case of the normal state. A third operation amount X3 is a combination of the first operation amount X1 and the second operation amount X2, and is represented by "X3=a×X1+(1−a)×X2." Here, the coefficient is a real number greater than 0 and less than 1. A fourth operation amount X4, which is a kind of the second operation amount X2 determined by the autonomous driving function of the vehicle 100, is an operation amount used particularly in case of emergency. For example, the fourth operation amount X4 is an operation amount for making the vehicle 100 safely stop or evacuate.

The operation amount coordinating unit 150 determines any one of the first operation amount X1, the second operation amount X2, the third operation amount X3, and the fourth operation amount X4 as the final operation amount X according to the results of the variety of abnormality determination processes.

First, for the sake of simplicity, a combination of the communication state and the terminal state is considered. When neither the communication abnormality nor the terminal abnormality occurs, the first operation amount X1 is selected (see Nos. 1 and 2). When it is determined that the terminal abnormality occurs, the second operation amount X2 is selected instead of the first operation amount X1 (see Nos. 7, 8, 16, 17, 25, and 26). This improves the safety. When it is determined that the communication abnormality occurs, the second operation amount X2 is selected instead of the first operation amount X1 (see Nos. 19, 20, 22, 23, 25, and 26). This improves the safety.

A "first determination-in-progress period" is the above-mentioned period of determination-in-progress regarding the terminal abnormality. When it is determined that no communication abnormality occurs during the first determination-in-progress period, the third operation amount X3 is selected (see Nos. 4 and 5). Since the second operation amount X2 partially contributes to the operation amount X, it is possible to improve the safety in a case where the terminal abnormality actually occurs. Moreover, since the operation amount is not completely switched to the second operation amount X2 and thus an influence of the first operation amount X1 remains, it is possible to suppress the remote operator O's sense of discomfort in a case where no terminal abnormality actually occurs.

A "second determination-in-progress period" is the above-mentioned period of determination-in-progress regarding the communication abnormality. When it is determined that no terminal abnormality occurs during the second determination-in-progress period, the first operation amount X1 is selected (see Nos. 10 and 11). Continuing to use the first operation amount X1 even during the determination of the communication abnormality is in progress makes it possible to improve continuity of the remote operation by the remote operator O.

During a period in which the first determination-in-progress period and the second determination-in-progress period overlap, the third operation amount X3 is selected (see Nos. 13 and 14). Since the second operation amount X2 partially contributes to the operation amount X, it is possible to improve the safety in a case where the terminal abnormality actually occurs. Moreover, since the operation amount is not completely switched to the second operation amount X2 and thus an influence of the first operation amount X1 remains, it is possible to suppress the remote operator O's sense of discomfort in a case where no terminal abnormality actually occurs.

Next, a combination of the communication state, the terminal state, and the vehicle state is considered. The same as in the above-described cases is applied to a case when no vehicle abnormality occurs and a case where the determination of the vehicle abnormality is progress. On the other hand, when it is determined that the vehicle abnormality occurs, the fourth operation amount X4 which is the second operation amount X2 in case of emergency is basically selected (see Nos. 3, 6, 12, 15, 18, 21 24, and 27). It is thus possible to make the vehicle 100 stop safely. However, even when the vehicle abnormality occurs, if the camera mounted on the vehicle 100 is normal, the first operation amount X1 or the third operation amount X3 may be selected (see Nos. 3, 6, 12, and 15).

4-7. Effects

As described above, according to the present embodiment, the control device 105 of the vehicle 100 is configured to execute the abnormality determination process and the operation amount coordinating process. In the operation amount coordinating process, the control device 105 determines the "final operation amount X" from among the first operation amount X1, the second operation amount X2, the third operation amount X3, and the fourth operation amount X4 according to the result of the abnormality determination process. Then, the vehicle 100 is controlled in accordance with the determined operation amount X. It is thus possible to appropriately control the vehicle 100 in consideration of the state of the abnormality when the abnormality occurs in the remote operation system 1.

5. CONFIGURATION EXAMPLE OF COMBINATION

Figure 15:
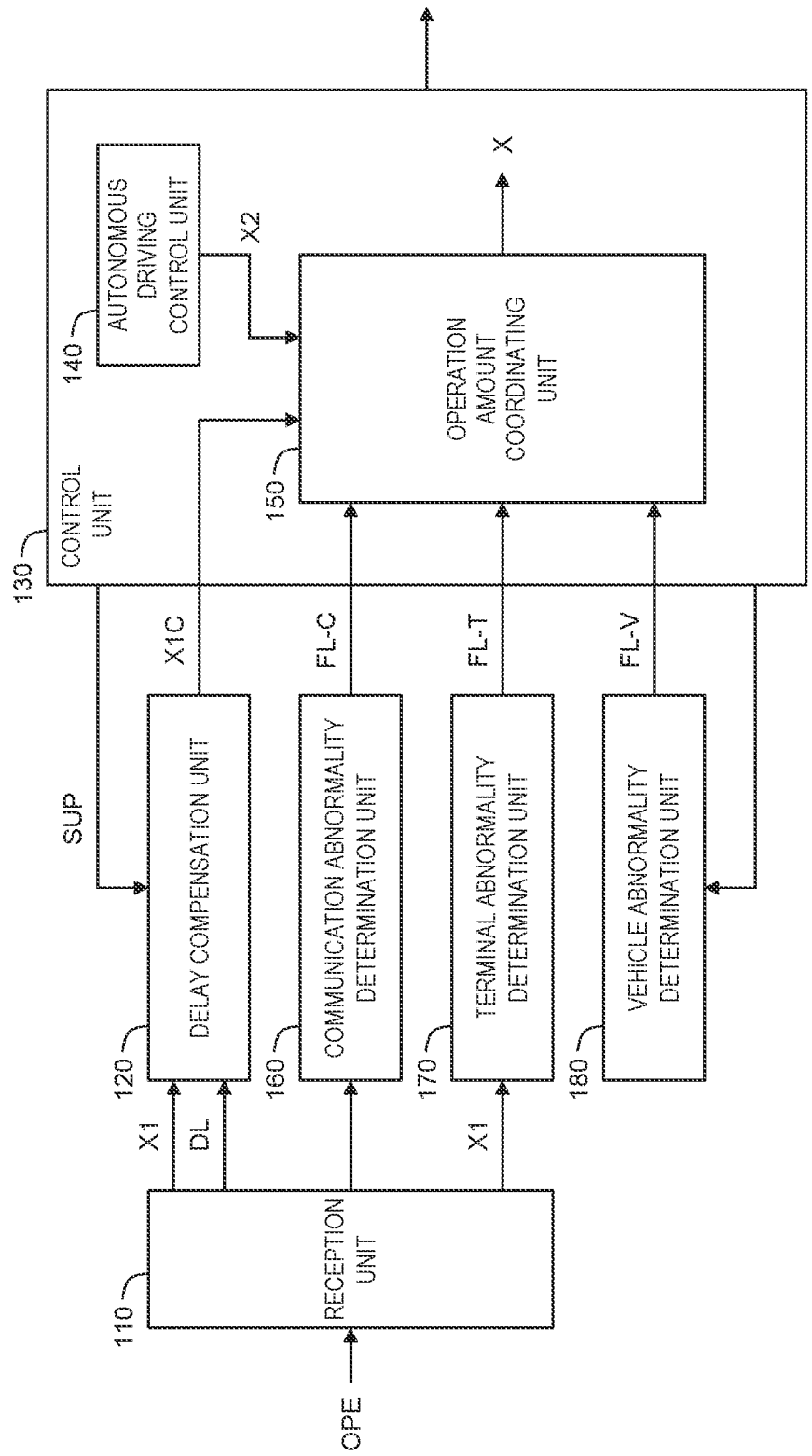
FIG. 15 is a block diagram showing an example of a functional configuration related to a variety of processes in a vehicle according to an embodiment of the present disclosure.

It is also possible to combine the delay compensation process described in the above Section 3 and the abnormality determination process and the operation amount coordinating process described in the above Section 4. FIG. 15 shows a functional configuration example in the case of the combination. The vehicle 100 includes the reception unit 110, the delay compensation unit 120, the control unit 130, the communication abnormality determination unit 160, the terminal abnormality determination unit 170, and the vehicle abnormality determination unit 180.

The delay compensation unit 120 calculates the first correction operation amount X1C based on the first operation amount X1 and the delay amount DL. The operation amount coordinating unit 150 receives the first correction operation amount X1C instead of the first operation amount X1. Then, the operation amount coordinating unit 150 executes the operation amount coordinating process based on the first correction operation amount X1C and the second operation amount X2 to determine the final operation amount X.

As a result, both the effect of the Section 3 and the effect of the Section 4 can be obtained. That is, the safety of the remote operation of the vehicle 100 is further improved.

6. EXAMPLE OF REMOTE OPERATOR TERMINAL

Figure 16:
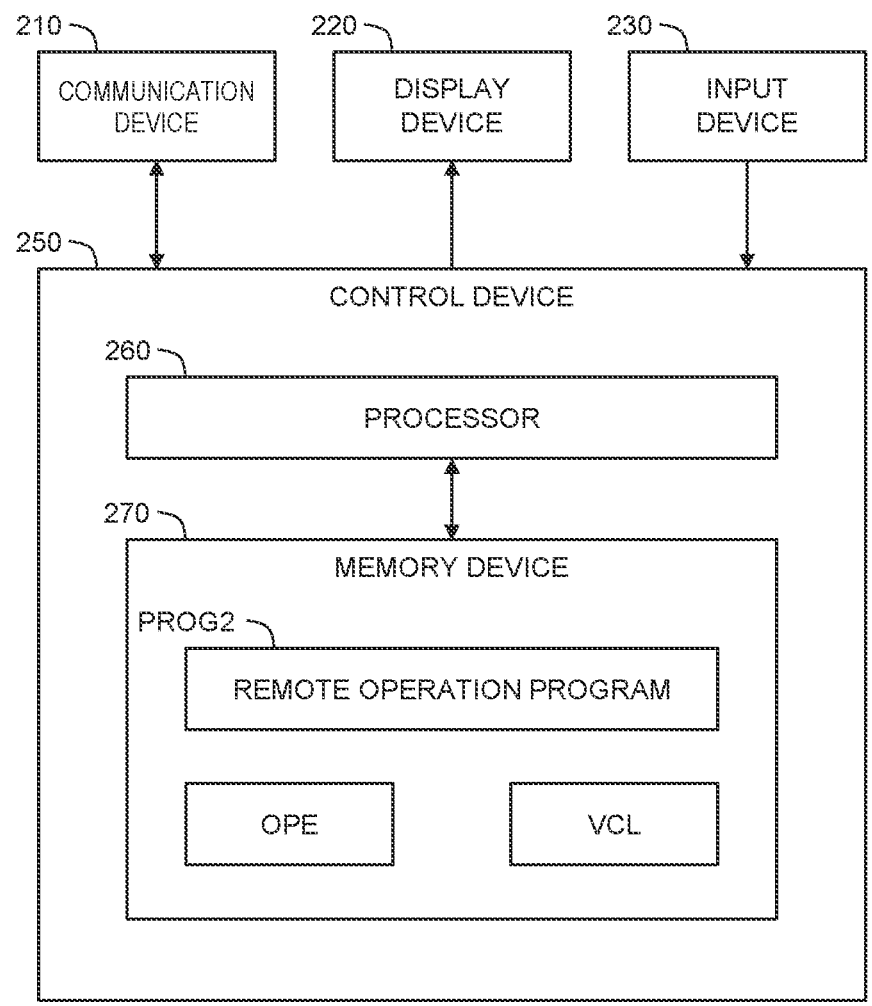
FIG. 16 is a block diagram showing a configuration example of a remote operator terminal according to an embodiment of the present disclosure.

FIG. 16 is a block diagram showing a configuration example of the remote operator terminal 200. The remote operator terminal 200 includes a communications device 210, a display 220, an input device 230, and a control device (controller) 250.

The communication device 210 communicates with the vehicle 100 and the management device 300.

The display device 220 presents a variety of information to the remote operator O by displaying the variety of information.

The input device 230 receives an input from the remote operator O. For example, the input device 230 includes a remote operation member that is operated by the remote operator O when remotely operating the vehicle 100. The remote operation member includes a steering wheel, an accelerator pedal, a brake pedal, a direction indicator, and the like.

The control device 250 controls the remote operator terminal 200. The control device 250 includes one or more processors 260 (hereinafter simply referred to as a processor 260) and one or more memory devices 270 (hereinafter simply referred to as a memory device 270). The processor 260 executes a variety of processing. For example, the processor 260 includes a CPU. The memory device 270 stores a variety of information necessary for the processing by the processor 260. Examples of the memory device 270 include a volatile memory, a non-volatile memory, an HDD, an SSD, and the like.

A remote operation program PROG2 is a computer program executed by the processor 260. The functions of the control device 250 are implemented by the processor 260 executing the remote operation program PROG2. The remote operation program PROG2 is stored in the memory device 270. The remote operation program PROG2 may be recorded on a non-transitory computer-readable recording medium. The remote operation program PROG2 may be provided via a network.

The control device 250 communicates with the vehicle 100 via the communication device 210. The control device 250 receives the vehicle information VCL transmitted from the vehicle 100. The control device 250 presents the vehicle information VCL to the remote operator O by displaying the vehicle information VCL including the image information on the display device. The remote operator O is able to recognize the state of the vehicle 100 and the situation around the vehicle 100 based on the vehicle information VCL displayed on the display device.

The remote operator O operates the remote operation member of the input device 230. An operation amount of the remote operation member is detected by a sensor installed on the remote operation member. The control device 250 generates the remote operation information OPE reflecting the operation amount of the remote operation member operated by the remote operator O. Then, the control device 250 transmits the remote operation information OPE to the vehicle 100 via the communication device 210.

What is claimed is:

1. A control device that controls a moving body being a target of a remote operation performed by a remote operator, the control device comprising one or more processors mounted on the moving body and configured to:
   during the remote operation of the moving body, perform a communication with a remote operator terminal on a side of the remote operator to receive remote operation information including a first operation amount caused by the remote operator;
   acquire a delay amount of a communication from the remote operator terminal to the moving body based on a result of reception of the remote operation information;
   execute a delay compensation process that compensates for a delay of the first operation amount based on the delay amount to calculate a first correction operation amount;
   execute an upsampling process that increases a sampling frequency of the first correction operation amount by estimating the first correction operation amount in a non-sampling period; and
   control the moving body based on the first correction operation amount.

2. The control device according to claim 1, wherein:
   a control frequency of controlling the moving body is higher than a communication frequency of the remote operation information, and
   the one or more processors are configured to execute the upsampling process such that a difference between the sampling frequency of the first correction operation amount and the control frequency becomes smaller than a difference between the communication frequency and the control frequency.

3. The control device according to claim 1, wherein:
   the one or more processors are configured to:
   estimate the first correction operation amount in the non-sampling period by feeding back an estimate value of the first correction operation amount acquired by the upsampling process and the first correction operation amount acquired by the delay compensation process; and
   calculate the first correction operation amount by correcting the estimate value of the first correction operation amount based on the first operation amount received from the remoter operator terminal while performing the delay compensation process based on the delay amount.

4. The control device according to claim 3, wherein:
   the one or more processors are configured to execute the upsampling process and the delay compensation process by applying a delayed Kalman filter to the first operation amount.

5. The control device according to claim 1, wherein:
   in the upsampling process, the one or more processors are configured to estimate the first correction operation amount further based on supplementary information including at least one of a shape of a road on which the moving body moves and a control amount of the moving body.

6. The control device according to claim 1, wherein:
the moving body has an autonomous driving function, and
the one or more processors are further configured to:
  execute a communication abnormality determination process that determines, based on a state of the communication with the remote operator terminal, whether or not an abnormality occurs in the communication with the remote operator terminal;
  execute a terminal abnormality determination process that determines, based on the first operation amount, whether or not an abnormality occurs in the remote operator terminal;
  execute an operation amount coordinating process that determines an operation amount based on at least one of the first correction operation amount and a second operation amount determined by the autonomous driving function according to results of the communication abnormality determination process and the terminal abnormality determination process; and
  control the moving body in accordance with the determined operation amount.

7. A control method for controlling a moving body being a target of a remote operation performed by a remote operator, the control method comprising:
  during the remote operation of the moving body, performing a communication with a remote operator terminal on a side of the remote operator to receive remote operation information including a first operation amount caused by the remote operator;
  acquiring a delay amount of a communication from the remote operator terminal to the moving body based on a result of reception of the remote operation information;
  a delay compensation process that compensates for a delay of the first operation amount based on the delay amount to calculate a first correction operation amount;
  an upsampling process that increases a sampling frequency of the first correction operation amount by estimating the first correction operation amount in a non-sampling period; and
  controlling the moving body based on the first correction operation amount.

8. A non-transitory computer-readable recording medium on which a control program is recorded, the control program being a compute program for controlling a moving body being a target of a remote operation performed by a remote operator, the control program, when executed by a computer mounted on the moving body, causing the computer to:
  during the remote operation of the moving body, perform a communication with a remote operator terminal on a side of the remote operator to receive remote operation information including a first operation amount caused by the remote operator;
  acquire a delay amount of a communication from the remote operator terminal to the moving body based on a result of reception of the remote operation information;
  execute a delay compensation process that compensates for a delay of the first operation amount based on the delay amount to calculate a first correction operation amount;
  an upsampling process that increases a sampling frequency of the first correction operation amount by estimating the first correction operation amount in a non-sampling period; and
  control the moving body based on the first correction operation amount.

* * * * *